US012315426B2

(12) United States Patent
Okamura et al.

(10) Patent No.: US 12,315,426 B2
(45) Date of Patent: May 27, 2025

(54) DEVICE AND METHOD FOR INTERNAL HORIZONTAL SYNC SIGNAL GENERATION

(71) Applicant: Synaptics Incorporated, San Jose, CA (US)

(72) Inventors: Kazuhiro Okamura, Tokyo (JP); Keiichi Hirano, Kanagawa (JP); Hirokazu Hatayama, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/473,722

(22) Filed: Sep. 25, 2023

(65) Prior Publication Data

US 2025/0104598 A1 Mar. 27, 2025

(51) Int. Cl.
*G09G 3/20* (2006.01)

(52) U.S. Cl.
CPC ... *G09G 3/2096* (2013.01); *G09G 2310/0243* (2013.01); *G09G 2310/0264* (2013.01)

(58) Field of Classification Search
None
See application file for complete search history.

(56) References Cited

U.S. PATENT DOCUMENTS

2003/0098838 A1* 5/2003 Minami ............... G09G 3/3614 345/87
2009/0109207 A1* 4/2009 Nakamura ............. G09G 5/006 345/214
2024/0013704 A1* 1/2024 Kim ..................... G09G 3/2096

* cited by examiner

*Primary Examiner* — Amr A Awad
*Assistant Examiner* — Donna V Bocar
(74) *Attorney, Agent, or Firm* — Leydig, Voit & Mayer, Ltd.

(57) ABSTRACT

A display driver includes a timing controller and a drive circuit. The timing controller receives an external horizontal sync signal and generates an internal horizontal sync signal based on the external horizontal sync signal. The drive circuit drives a display panel in synchronization with the internal horizontal sync signal. Generating the internal horizontal sync signal includes: generating a first pulse of the internal horizontal sync signal in response to detection of a first pulse of the external horizontal sync signal after a masking period has expired, wherein the masking period starts when a first previous pulse is detected in the external horizontal sync signal; and generating a second pulse of the internal horizontal sync signal in response to detection of a second pulse of the external horizontal sync signal in a non-masking period which starts when a second previous pulse is detected in the external horizontal sync signal.

18 Claims, 9 Drawing Sheets

DEVICE AND METHOD FOR INTERNAL HORIZONTAL SYNC SIGNAL GENERATION

TECHNICAL FIELD

This disclosure relates generally to display devices and more particularly to generation of internal horizontal sync signals in display devices.

BACKGROUND

Display drivers configured to drive display panels (e.g., liquid crystal display (LCD) panels, organic light emitting diode (OLED) display panels, and micro light emitting diode (μLED) display panels) may be configured to externally receive a horizontal sync signal and a vertical sync signal from an external controller to operate in synchronization with the horizontal sync signal and the vertical sync signal. The horizontal sync signal may define the beginning and end of each horizontal sync period (or line period), and the vertical sync signal may define the beginning and end of each vertical sync period (or frame period). The externally received horizontal sync signal may be hereinafter referred to as the external horizontal sync signal, and the externally received vertical sync signal may be hereinafter referred to as the external vertical sync signal.

Display drivers may generate an internal horizontal sync signal and an internal vertical sync signal from the external horizontal sync signal and the external vertical sync signal, respectively, for internal use. More specifically, display drivers may be configured to generate pulses of the internal horizontal sync signal in response to detections of pulses in the external horizontal sync signal and generate pulses of the internal vertical sync signal in response to detections of pulses in the external vertical sync signal. The thus generated internal horizontal sync signal and internal vertical sync signal may be used to achieve timing control in the display drivers.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a display driver. The display driver includes a timing controller and a drive circuit. The timing controller is configured to receive an external horizontal sync signal and generate an internal horizontal sync signal based on the external horizontal sync signal. The drive circuit is configured to drive a display panel in synchronization with the internal horizontal sync signal. Generating the internal horizontal sync signal includes generating a first pulse of the internal horizontal sync signal in response to detection of a first pulse of the external horizontal sync signal after a masking period has expired. The masking period starts when the timing controller detects a first previous pulse of the external horizontal sync signal before the detection of the first pulse of the external horizontal sync signal. Generating the internal horizontal sync signal further includes generating a second pulse of the internal horizontal sync signal in response to detection of a second pulse of the external horizontal sync signal in a non-masking period which starts when the timing controller detects a second previous pulse of the external horizontal sync signal before the detection of the second pulse of the external horizontal sync signal.

In another exemplary embodiment, the present disclosure provides a system. The system includes an external source and a display driver. The external source is configured to provide an external horizontal sync signal. The display driver is configured to generate an internal horizontal sync signal based on the external horizontal sync signal, and drive a display panel in synchronization with the internal horizontal sync signal. Generating the internal horizontal sync signal includes generating a first pulse of the internal horizontal sync signal in response to detection of a first pulse of the external horizontal sync signal after a masking period has expired. The masking period starts when the timing controller detects a first previous pulse of the external horizontal sync signal before the detection of the first pulse of the external horizontal sync signal. Generating the internal horizontal sync signal further includes generating a second pulse of the internal horizontal sync signal in response to detection of a second pulse of the external horizontal sync signal in a non-masking period which starts when the timing controller detects a second previous pulse of the external horizontal sync signal before the detection of the second pulse of the external horizontal sync signal.

In yet another exemplary embodiment, the present disclosure provides a method. The method includes receiving an external horizontal sync signal. The method further includes generating a first pulse of an internal horizontal sync signal in response to detection of a first pulse of the external horizontal sync signal after a masking period has expired. The masking period starts when a first previous pulse of the external horizontal sync signal is detected before the detection of the first pulse of the external horizontal sync signal. The method further includes generating a second pulse of the internal horizontal sync signal in response to detection of a second pulse of the external horizontal sync signal in a non-masking period which starts when a second previous pulse of the external horizontal sync signal is detected before the detection of the second pulse of the external horizontal sync signal. The method further includes driving a display panel in synchronization with the internal horizontal sync signal.

Further features and aspects are described in additional detail below with reference to the attached drawings.

Figure 1:
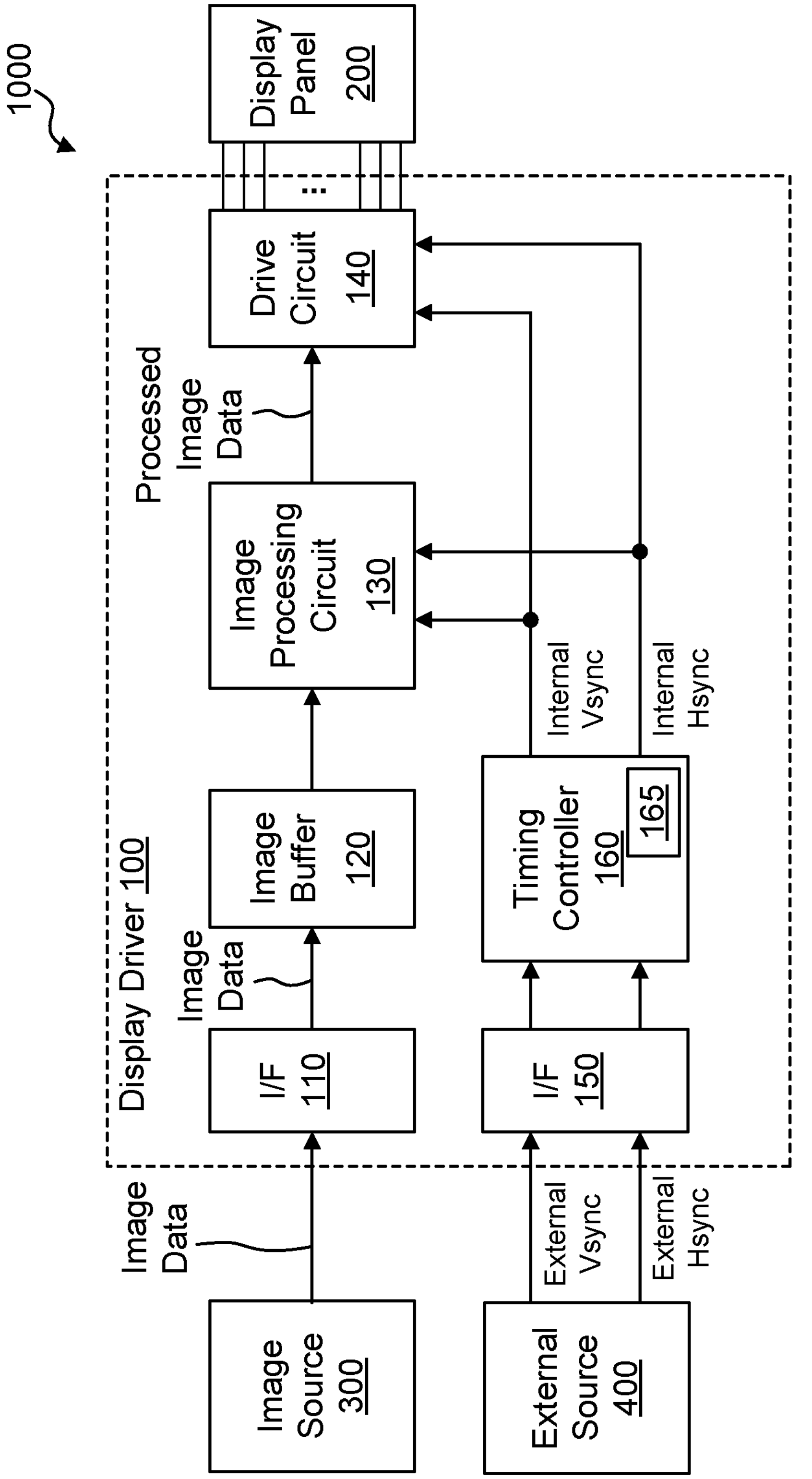
FIG. 1 is a block diagram showing an exemplary configuration of a display device, according to one or more examples of the present disclosure.

To facilitate understanding, identical reference numerals have been used, where possible, to designate elements that are common to the figures. It is contemplated that elements disclosed in one embodiment may be utilized in other embodiments without specific recitation. Suffixes may be attached to reference numerals for distinguishing elements from each other. The drawings referred to herein should not be understood as being drawn to scale unless specifically noted. Also, the drawings are often simplified and details or components omitted for clarity of presentation and explanation. The drawings and discussion serve to explain principles discussed below.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, summary, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term “coupled” as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

Display drivers configured to drive display panels (e.g., LCD panels, OLED display panels, and μLED display panels) may be configured to receive an external horizontal sync (Hsync) signal and an external vertical sync (Vsync) signal from an external controller to operate in synchronization with the external Hsync signal and the external Vsync signal. The external Hsync signal may define the beginning and end of each horizontal sync period (or line period), and the external Vsync signal may define the beginning and end of each vertical sync period (or frame period). A horizontal sync period may be defined as a period between the times when two adjacent pulses appear in the external Hsync signal, and a vertical sync period may be defined as a period between the times when two adjacent pulses appear in the external Vsync signal.

Display drivers may generate an internal Hsync signal and an internal Vsync signal from the external Hsync signal and the external Vsync signal, respectively, for internal use. More specifically, display drivers may be configured to generate pulses of the internal Hsync signal in response to detections of pulses in the external Hsync signal and generate pulses of the internal Vsync signal in response to detections of pulses in the external Vsync signal. The thus generated internal Hsync signal and internal Vsync signal may be delivered to various circuits (e.g., an image processing circuit, a panel interface circuit, and a source drive circuit) in the display drivers to achieve timing control.

In a practical operating environment, noise, such as electrostatic discharge (ESD) noise, may affect the external Hsync signal and/or the external Vsync signal. The external Hsync signal and/or the external Vsync signal may contain a noise-induced pulse, which may cause an unintended pulse to be generated in the internal Hsync signal and/or the internal Vsync signal. The unintended pulse may cause timing disorders during operation and may result in malfunction (e.g., image corruption) of the display device.

One method for mitigating the effects of noise may be to implement signal masking on the external Hsync signal and/or the external Vsync signal. In one implementation, the signal masking may be achieved by preventing the display device from detecting and/or processing pulses in the external Hsync signal and/or the external Vsync signal during masking periods. For example, during signal masking, the display device may discard or filter out noise-induced pulses when detecting pulses in the external Hsync signal and/or the external Vsync signal, thereby allowing the pulses of the internal Hsync signal and/or the internal Vsync signal to be generated at the appropriate timing.

Some implementations may achieve the synchronization between the external Hsync signal and the external Vsync signal by adjusting the duration of a specific one of the horizontal sync periods of each vertical sync period. The specific one of the horizontal sync periods may hereinafter be referred to as the duration-adjusted horizontal sync period. In an ideal operation, the external Hsync signal and the external Vsync signal are desired to be generated such that the period of the external Vsync signal is exactly an integer multiple of the period of the external Hsync signal (e.g., the frequency of the external Hsync signal is exactly an integer multiple of the frequency of the external Vsync signal). In actual implementations, however, the external Hsync signal and the external Vsync signal may be generated by different oscillators with insufficient timing precision for pulse generation. In such implementations, the period of the external Vsync signal may be significantly different from an integer multiple of the period of the external Hsync signal. To achieve synchronization of the external Hsync signal with the external Vsync signal, the duration of the duration-adjusted horizontal sync period of each vertical sync period may be adjusted so that the end of the last horizontal sync period of each vertical sync period is coincident with the start of the next vertical sync period. The duration of the duration-adjusted horizontal sync period may be different from the duration of other horizontal sync periods.

The present disclosure recognizes that the use of duration-adjusted horizontal sync periods may be incompatible with the signal masking applied to the external Hsync signal, because the signal masking may undesirably discard pulses that define the duration-adjusted horizontal sync periods. The present disclosure provides various techniques used for properly generating the internal Hsync signal in a display device configured to implement signal masking on the external Hsync signal and/or the external Vsync signal.

FIG. 1 is a block diagram showing an exemplary configuration of a display device 1000, according to one or more examples of the present disclosure. In the shown embodiment, the display device 1000 includes a display driver 100 and a display panel 200. Examples of the display panel 200 include, but are not limited to, LCD panels, OLED display panels, μLED display panels, and other display panels with suitable display technologies.

The display driver 100 is configured to receive image data from an image source 300 and drive or update the display panel 200 based on the image data. In the shown embodiment, the display driver 100 includes an interface (I/F) 110, an image buffer 120, an image processing circuit 130, and a drive circuit 140. The interface 110 is configured to receive the image data from the image source 300 and forward the received image data to the image buffer 120. The image buffer 120 is configured to temporarily store the image data. The image processing circuit 130 is configured to receive the image data from the image buffer 120 and process the received image data to generate the processed image data. The image processing circuit 130 is further configured to provide the processed image data to the drive circuit 140. The drive circuit 140 is configured to drive or update the display panel 200 based on the processed image data. In one implementation, the drive circuit 140 is configured as a source driver that generates data voltages based on the processed image data and drive or update pixels of the display panel 200 with the generated data voltages.

The display driver 100 is further configured to receive an external horizontal sync (Hsync) signal and an external vertical sync (Vsync) signal from an external source 400 and operate in synchronization with the external Hsync signal and the external Vsync signal. The external Hsync signal may define the beginning and end of each horizontal sync period (or line period), and the external Vsync signal may define the beginning and end of each vertical sync period (or frame period). In some implementations, the external source 400 may be a bridge integrated circuit (IC) or other type of IC configured to interface with the display driver 100. In other implementations, the external source 400 may be a master display driver configured to provide the external Hsync signal and the external Vsync signal to the display driver 100. In such implementations, the display driver 100 may operate as a slave display driver and update the display panel 200 in cooperation with the master display driver. Although FIG. 1 shows the external source 400 as a separate device from the image source 300, the image source 300 and the external source 400 may be formed as a single device.

In the shown embodiment, the display driver 100 further includes an interface 150 and the timing controller 160. The interface 150 is configured to receive the external Hsync signal and the external Vsync signal from the external source 400 and forward the external Hsync signal and the external Vsync signal to the timing controller 160. The timing controller 160 is configured to generate an internal Hsync signal and an internal Vsync signal from the external Hsync signal and the external Vsync signal, respectively. The internal Hsync signal and the internal Vsync signal are used for timing control in the display driver 100. More specifically, the timing controller 160 is further configured to provide the internal Hsync signal and the internal Vsync signal to the drive circuit 140, thereby controlling the operation timing of the drive circuit 140. The drive circuit 140 is configured to drive the display panel 200 in synchronization with the internal Hsync signal and the internal Vsync signal. The timing controller 160 may further be configured to provide the internal Hsync signal and/or the internal Vsync signal to other circuits in the display driver 100, which may include the image processing circuit 130. The image processing circuit 130 may be configured to process the image data using the internal Hsync signal and/or the internal Vsync signal.

In the shown embodiment, the timing controller 160 includes a register 165. In some implementations, the register 165 may be configured to store information used to control the generation of the internal Hsync signal and the internal Vsync signal.

Figure 2:
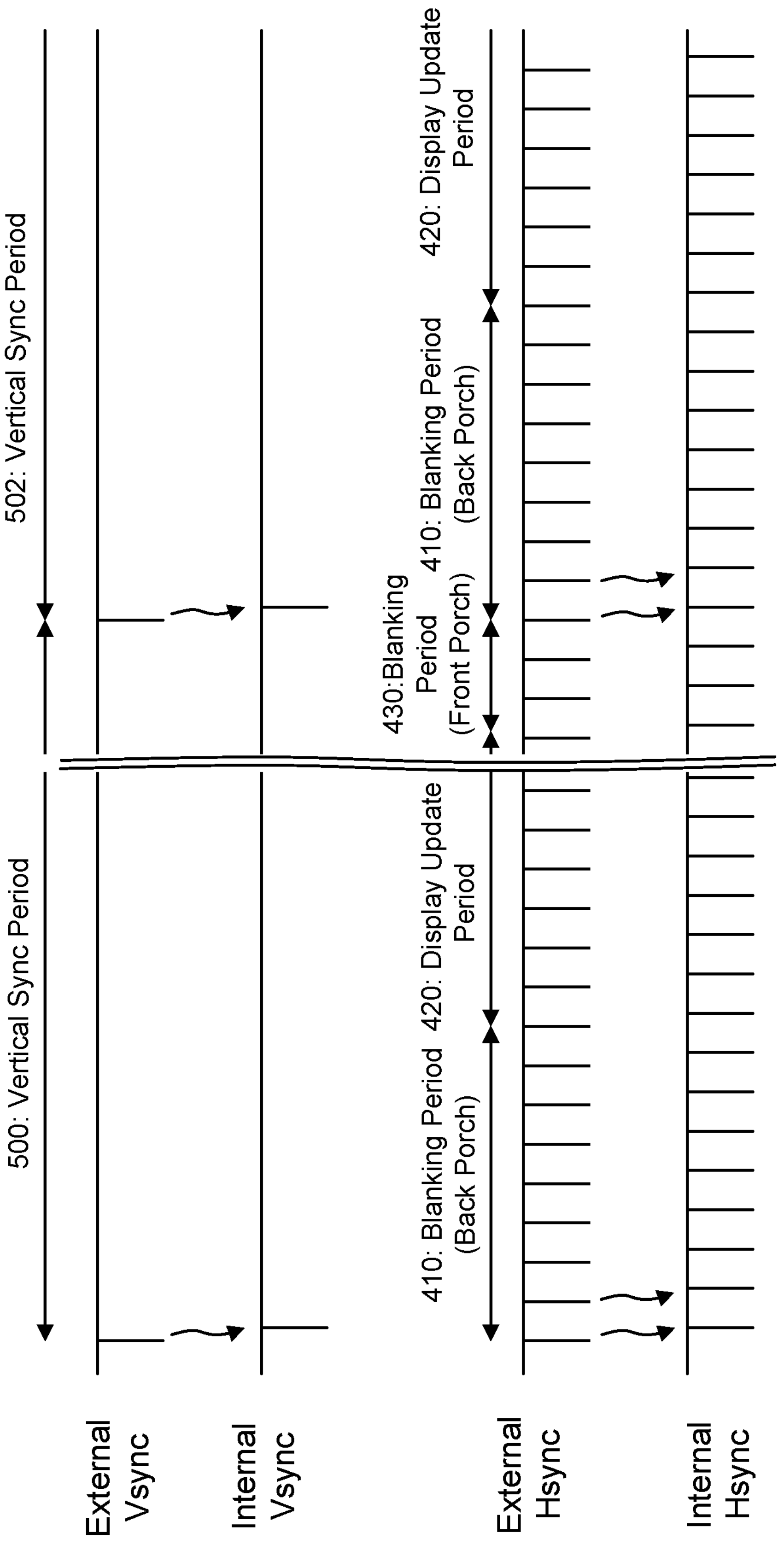
FIG. 2 shows an exemplary scheme for generating an internal horizontal sync signal and an internal vertical sync signal, according to one or more examples of the present disclosure.

FIG. 2 shows an exemplary scheme for generating the internal Hsync signal and the internal Vsync signal, according to one or more examples of the present disclosure. Shown in FIG. 2 is an example operation of the timing controller 160 to generate the internal Hsync signal and the internal Vsync signal during vertical sync periods 500 and 502, each of which includes a blanking period 410 (also referred to as a back porch period), a display update period 420, and a blanking period 430 (also referred to as a front porch period). A blanking period may also be referred to as a non-display update period.

The timing controller 160 is configured to detect pulses of the external Hsync signal and generate pulses of the internal Hsync signal in response to the detections of the external Hsync signal. In some implementations, the timing controller 160 may be configured to, when detecting a pulse of the external Hsync signal, generate a pulse of the internal Hsync signal after a predetermined delay from the detection of the pulse of the external Hsync signal. In other implementations, the timing controller 160 may be configured to generate a different number of pulses of the internal Hsync signal than the number of pulses of the external Hsync signal. For example, the timing controller 160 may be configured to generate three pulses of the internal Hsync signal for two pulses of the external Hsync signal.

The timing controller 160 is further configured to detect pulses of the external Vsync signal and generate pulses of the internal Vsync signal in response to the detections of the external Vsync signal. In one implementation, the timing controller 160 may be configured to, when detecting a pulse of the external Vsync signal, generate a pulse of the internal Vsync signal after a predetermined delay from the detection of the pulse of the external Vsync signal.

In one or more embodiments, the timing controller 160 is configured to implement signal masking on the external Hsync signal and/or the internal Vsync signal to mitigate an effect of noise, such as electrostatic discharge (ESD) noise, applied to the external Hsync signal and/or the external Vsync signal. The noise may generate an unintended pulse in the external Hsync signal and/or the external Vsync signal, which may result in generation of an unintended pulse of the internal Hsync signal and/or the internal Vsync signal. The generation of the unintended pulse may cause the display driver 100 to malfunction. The signal masking applied to the external Hsync signal and/or the internal Vsync signal may effectively prevent an unintended pulse of the internal Hsync signal from being generated by noise.

Figure 3A:
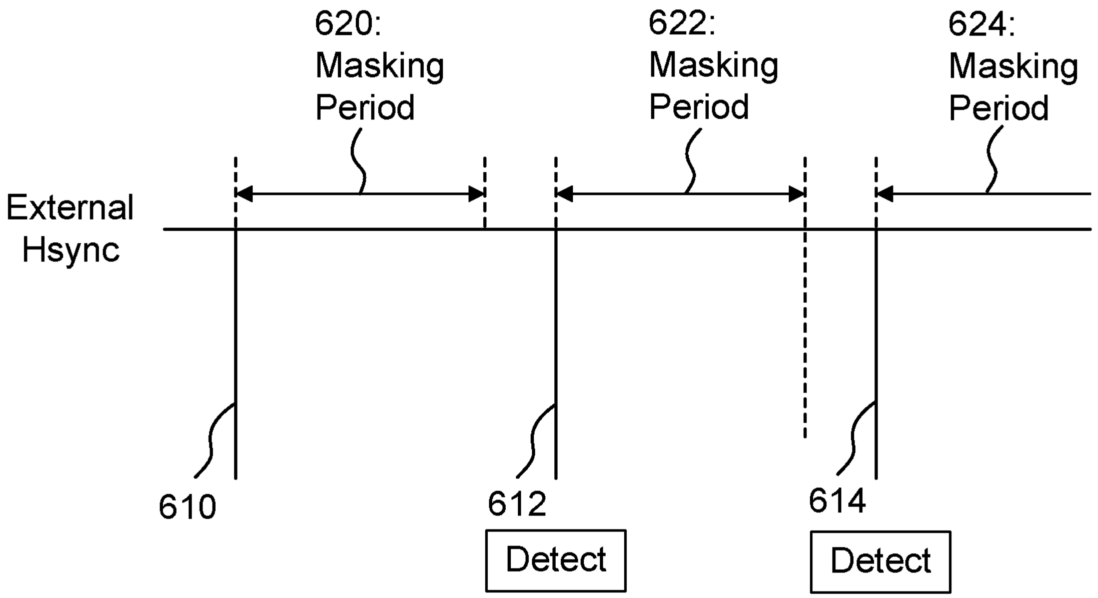
FIGS. 3A and 3B show exemplary signal masking implemented on an external horizontal sync signal, according to one or more examples of the present disclosure.

FIG. 3A shows exemplary signal masking implemented on the external Hsync signal, according to one or more examples of the present disclosure. As previously described, the signal masking of the external Hsync signal is accomplished by prohibiting the timing controller 160 from detecting any pulses in the external Hsync signal during a masking period, which starts each time the timing controller 160 detects a pulse of the external Hsync signal. Shown in FIG. 3A are masking periods 620, 622, and 624, which start when the timing controller 160 detects pulses 610, 612, and 614, respectively, in the external Hsync period. The time duration of the masking periods is set such that no pulses are expected to appear in the external Hsync signal during the masking periods. In some implementations, the time duration of the masking periods (e.g., the masking periods 620, 622, and 624) may be set to be slightly shorter than the period of the external Hsync period.

The timing controller 160 discards or rejects any pulses that appear in the external Hsync signal during the masking periods 620, 622, and 624. For example, when a noise-induced pulse 630 appears in the external Hsync signal during the masking period 620 as shown in FIG. 3B, the timing controller 160 discards the noise-induced pulse 630 and does not generating a corresponding pulse of the internal Hsync signal.

After the masking period 620 has expired, the timing controller 160 is allowed to detect a pulse of the external Hsync signal. In the examples shown in FIGS. 3A and 3B, after the masking period 620 has expired, the timing controller 160 detects the pulse 612 and generates a pulse of the internal Hsync signal. Meanwhile, the next masking period 622 starts in response to the detection of the pulse 612. The timing controller 160 is allowed to detect a pulse of the external Hsync signal after the masking period 622 has expired. The timing controller 160 detects the pulse 614 after the masking period 622 has expired, and the next masking period 624 starts in response to the detection of the pulse 614. A similar process is performed each time a pulse is detected in the external Hsync signal.

The timing controller 160 may also be configured to implement signal masking on the external Vsync signal to prevent an unintended pulse from being generated in the internal Vsync signal due to noise applied to the external Vsync signal. In one implementation, the timing controller 160 may be configured to discard all pulses in the external Vsync signal during a masking period which starts when a previous pulse is detected in the external Vsync signal. The masking period for the external Vsync signal may continue until the count of the pulses in the external Hsync signal reaches a predetermined number after the previous pulse is detected. Alternatively, similar to Hysnc, the masking period for the external Vsync may be set to be slightly shorter than the period of the external Vsync period.

Figure 3B:
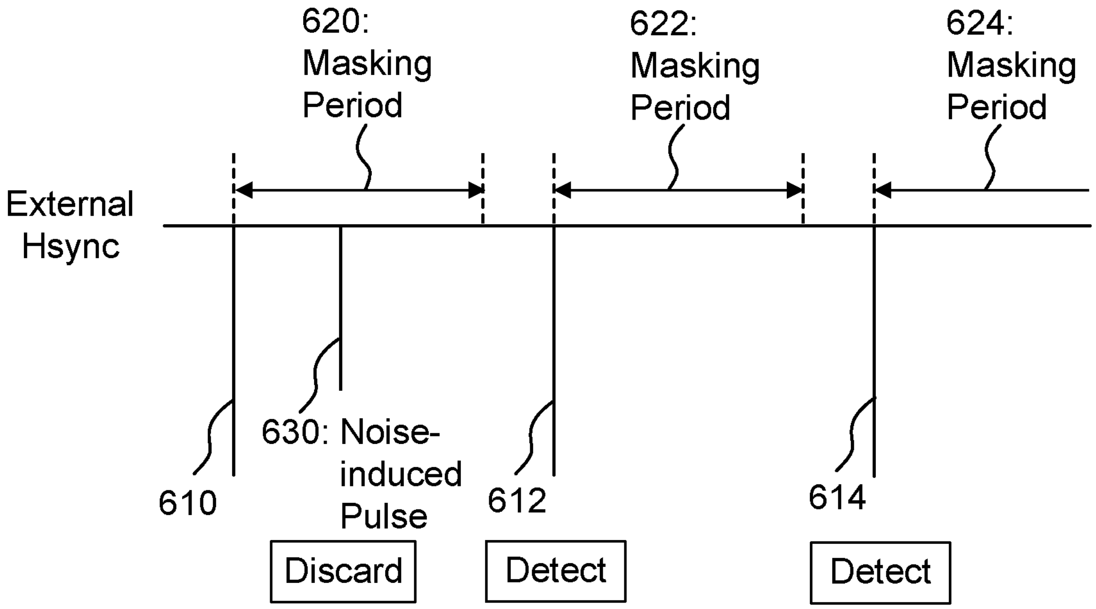
Figure 4:
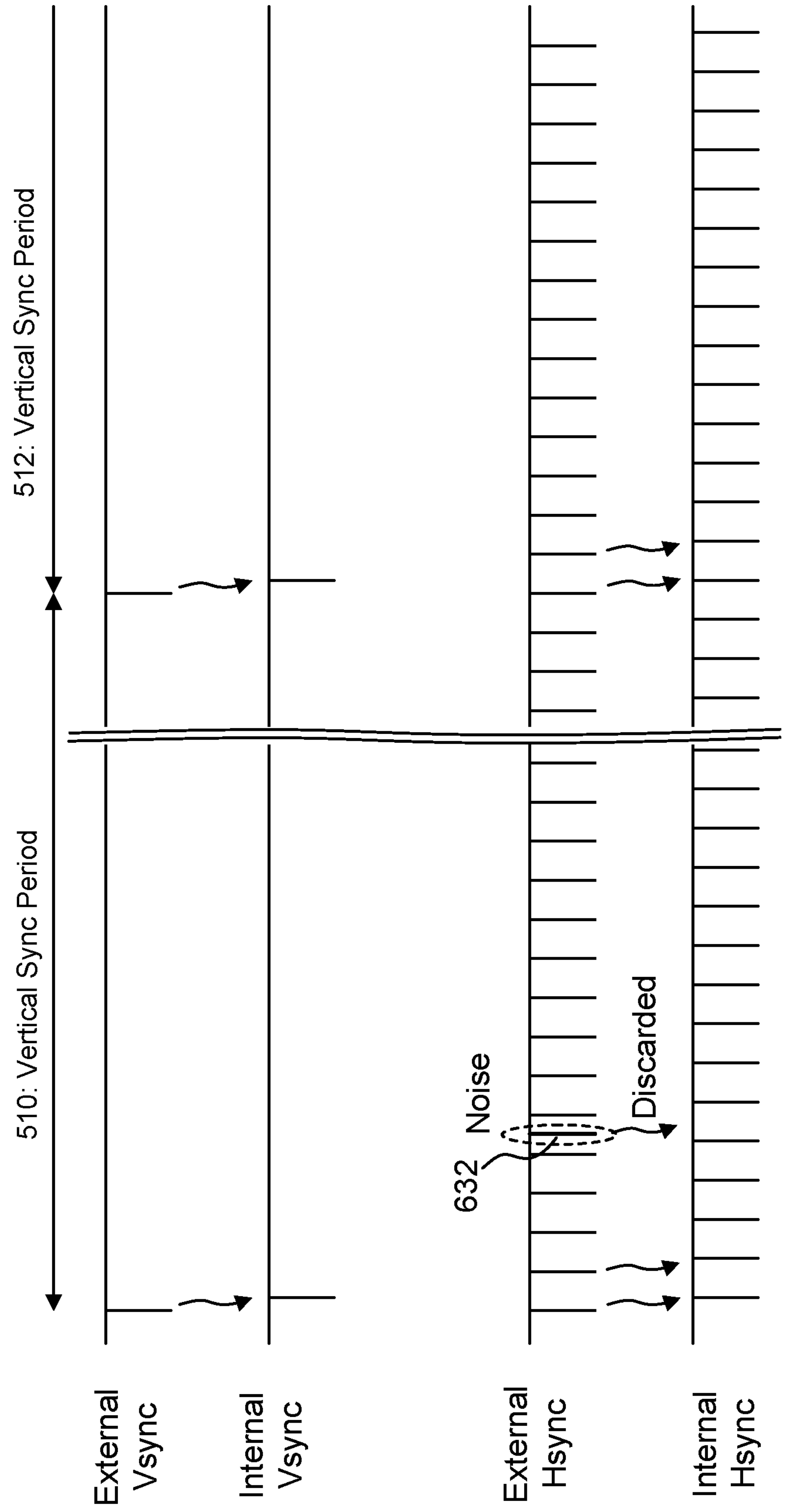
FIG. 4 shows exemplary waveforms of an internal horizontal sync signal and an internal vertical sync signal generated using the signal masking shown in FIGS. 3A and 3B, according to one or more examples of the present disclosure.

FIG. 4 shows exemplary waveforms of the internal Hsync signal and the internal Vsync signal generated using the signal masking shown in FIGS. 3A and 3B during vertical sync periods 510 and 512, according to one or more examples of the present disclosure. Although noise is applied to the external Hsync signal in the vertical sync period 510, the timing controller 160 discards the noise-induced pulse 632, thereby preventing an unintended pulse from being generated in the internal Hsync signal. This may effectively suppress the malfunction of the display driver 100.

In some implementations, as described above, the external source 400 may be configured to adjust the duration of a duration-adjusted horizontal sync period of each vertical sync period to achieve synchronization of the external Hsync signal with the external Vsync signal. The adjustment of the duration of the duration-adjusted horizontal sync period may be accomplished by adjusting the generation timing of a pulse that defines the end of the duration-adjusted horizontal sync period. The duration of the duration-adjusted horizontal sync period may be different from the duration of other horizontal sync periods. The duration of the duration-adjusted horizontal sync period of each vertical sync period may be adjusted so that the end of the last horizontal sync period of each vertical sync period is coincident with the start of the next vertical sync period.

Figure 5:
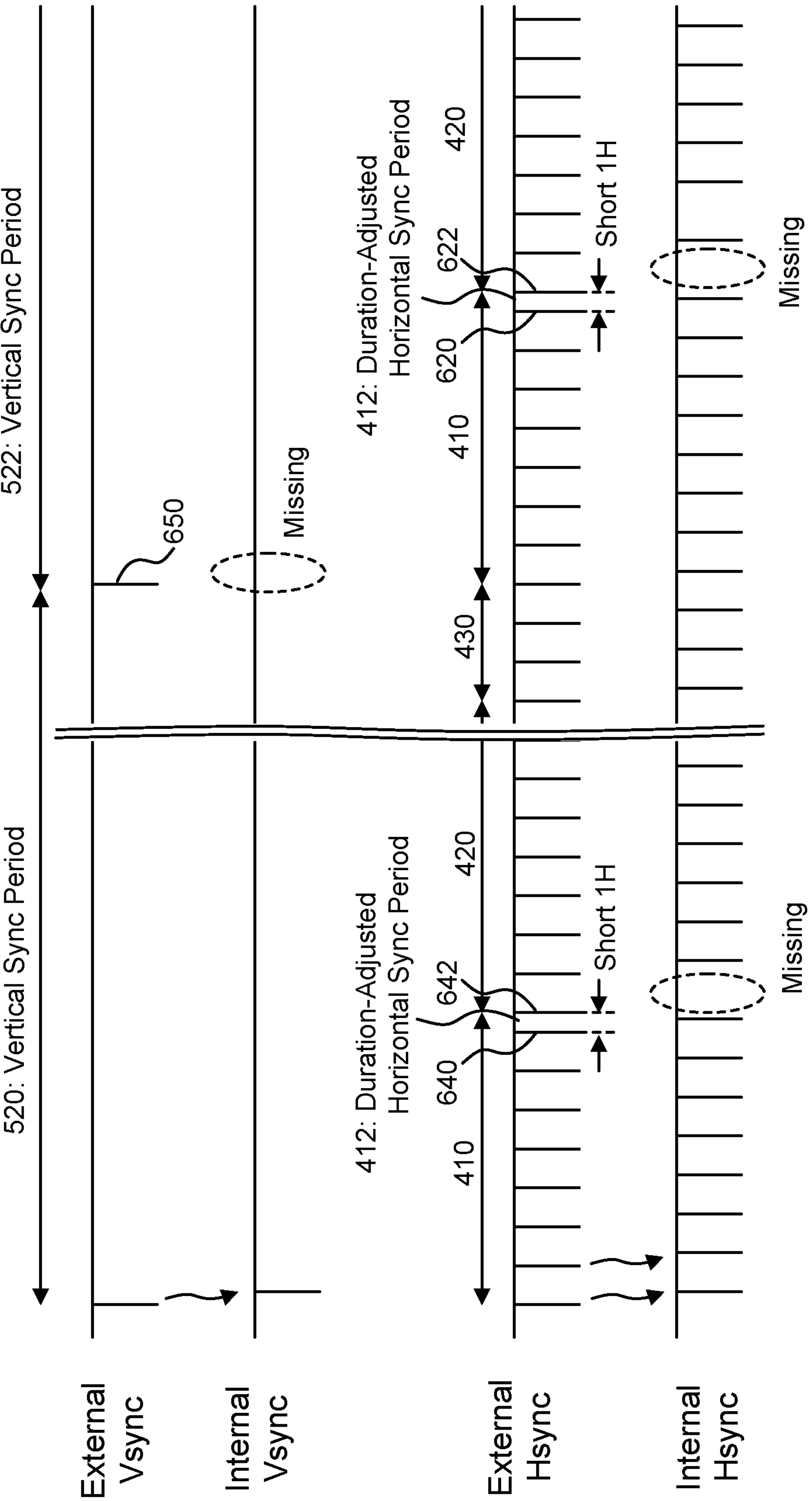
FIG. 5 shows an exemplary operation of a timing controller, according to one or more examples of the present disclosure.

FIG. 5 shows an exemplary operation of the timing controller 160 during vertical sync periods 520 and 522 each including a duration-adjusted horizontal sync period 412, according to one or more examples of the present disclosure. In the shown implementation, the duration-adjusted horizontal sync period 412 is provided in the blanking period 410 of each of the vertical sync periods 520 and 522, because changes in the durations of the horizontal sync periods during the display update period 420 may cause artifacts in the image displayed on the display panel 200. In the shown embodiment, the duration-adjusted horizontal sync period 412 is provided at the end of the blanking period 410 of each of the vertical sync periods 520 and 522. In other implementations, the duration-adjusted horizontal sync period 412 may be provided at any temporal positions in the blanking period 410 or 430 other than at the end of the blanking period 410. In one implementation, the external source 400 may be configured to count pulses in the external Hsync signal during each vertical sync period, and initiate the duration-adjusted horizontal sync period 412 when the count of the pulses in the external Hsync signal after the start of the current vertical sync period reaches a predetermined value.

The present disclosure recognizes that the signal masking described in relation to FIGS. 3A, 3B and 4 may be incompatible with the use of the duration-adjusted horizontal sync periods. In some cases, as shown in FIG. 5, the duration-adjusted horizontal sync periods may have such a short duration (as indicated by "Short 1H") that the pulses 642 of the external Hsync period that define the ends of the duration-adjusted horizontal sync periods 412 fall within the masking periods that start when the previous pulses 640 are detected. It is noted that the previous pulses 640 define the starts of the duration-adjusted horizontal sync periods 412, respectively. In such cases, the timing controller 160 may fail to detect the pulses 642, resulting in the failure to successfully generate the corresponding pulses of the internal Hsync signal. The absence of the corresponding pulses in the internal Hsync signal is indicated by "Missing" in FIG. 5. The absence of the pulses of the internal Hsync signal corresponding to the pulses 642 of the external Hsync signal may cause image artifacts due to timing control failure. For example, the drive circuit 140, which is configured to operate in synchronization with the internal Hsync signal, may fail to update the horizontal lines of the display panel 200 at the correct timing. Further, in embodiments where the masking period for the external Vsync signal is defined based on the count of the pulses of the external Hsync signal during each external vertical sync period, the timing controller 160 may fail to detect a pulse 650 in the external Vsync signal, resulting in the corresponding pulse of the internal Vsync signal not being generated, as is indicated by "Missing" in FIG. 5. The lack of the corresponding pulse of the internal Vsync signal may cause severe image corruption.

In one or more embodiments, to avoid failure to detect the pulses that define the ends of the duration-adjusted horizontal sync periods, the timing controller 160 is configured to implement modified signal masking on the external Hsync signal. The modified signal masking defines non-masking periods during which the timing controller 160 is allowed to detect pulses in the external Hsync signal. The timing controller 160 does not discard any pulses in the external Hsync signal during the non-masking period. In some embodiments, each non-masking period starts when the timing controller 160 detects a pulse of the external Hsync signal that defines the start of a duration-adjusted horizontal sync period.

Figure 6:
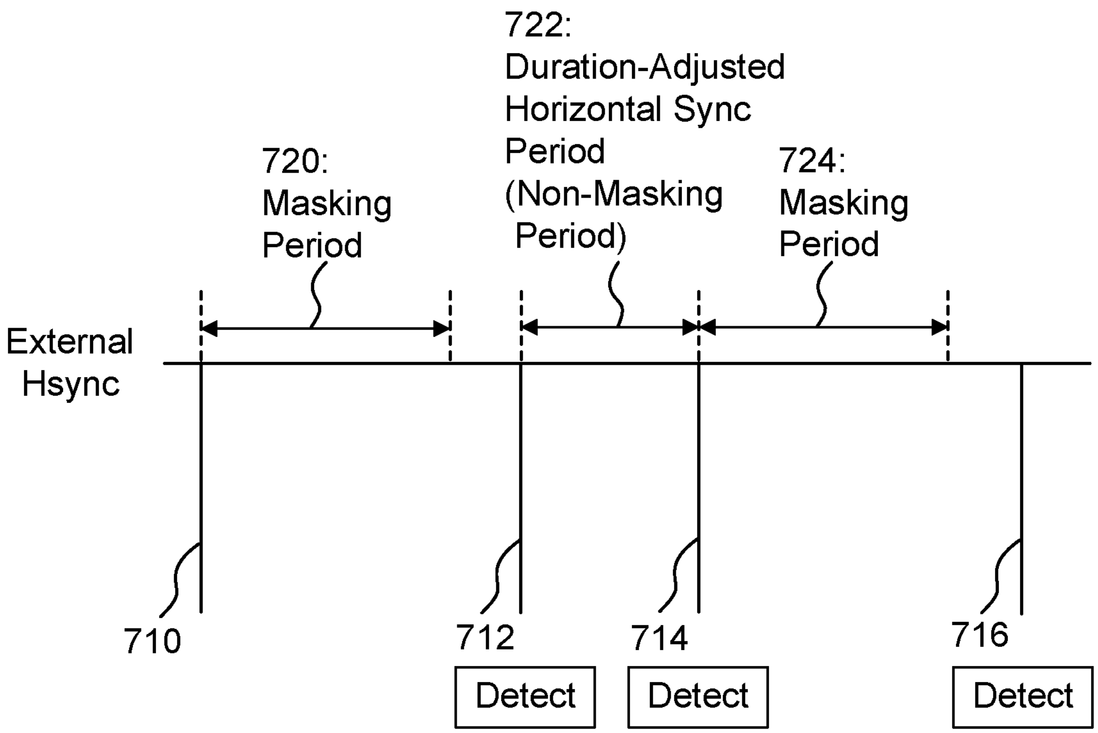
FIG. 6 shows an exemplary operation of a timing controller adapted to modified signal masking, according to one or more examples of the present disclosure.

FIG. 6 shows an exemplary operation of the timing controller 160 adapted to the modified signal masking, according to one or more examples of the present disclosure. In the example shown in FIG. 6, a masking period 720 starts when the timing controller 160 detects a pulse 710 in the external Hsync signal. After the masking period 720 has expired, the timing controller 160 detects a pulse 712 in the external Hsync signal. The timing controller 160 identifies the pulse 712 as the pulse that defines the start of a duration-adjusted horizontal sync period 722, which is a non-masking period. In one implementation, the timing controller 160 may make this identification based on the count of the pulses in the external Hsync signal after the start of the current vertical sync period. In the shown embodiment, the entire duration-adjusted horizontal sync period 722 is defined as a non-masking period during which the timing controller 160 is allowed to detect pulses in the external Hsync signal. Accordingly, the timing controller 160 successfully detects the pulse 714 in the external Hsync signal that defines the end of the duration-adjusted horizontal sync period 722 and generates a corresponding pulse of the internal Hsync signal in response to the detection of the pulse 714. The detection of the pulse 714 also causes a masking period 724 to start, and the timing controller 160 detects a pulse 716 in the external Hsync signal after the masking period 724 has expired. A similar process is then performed each time a pulse is detected in the external Hsync signal.

Figure 7A:
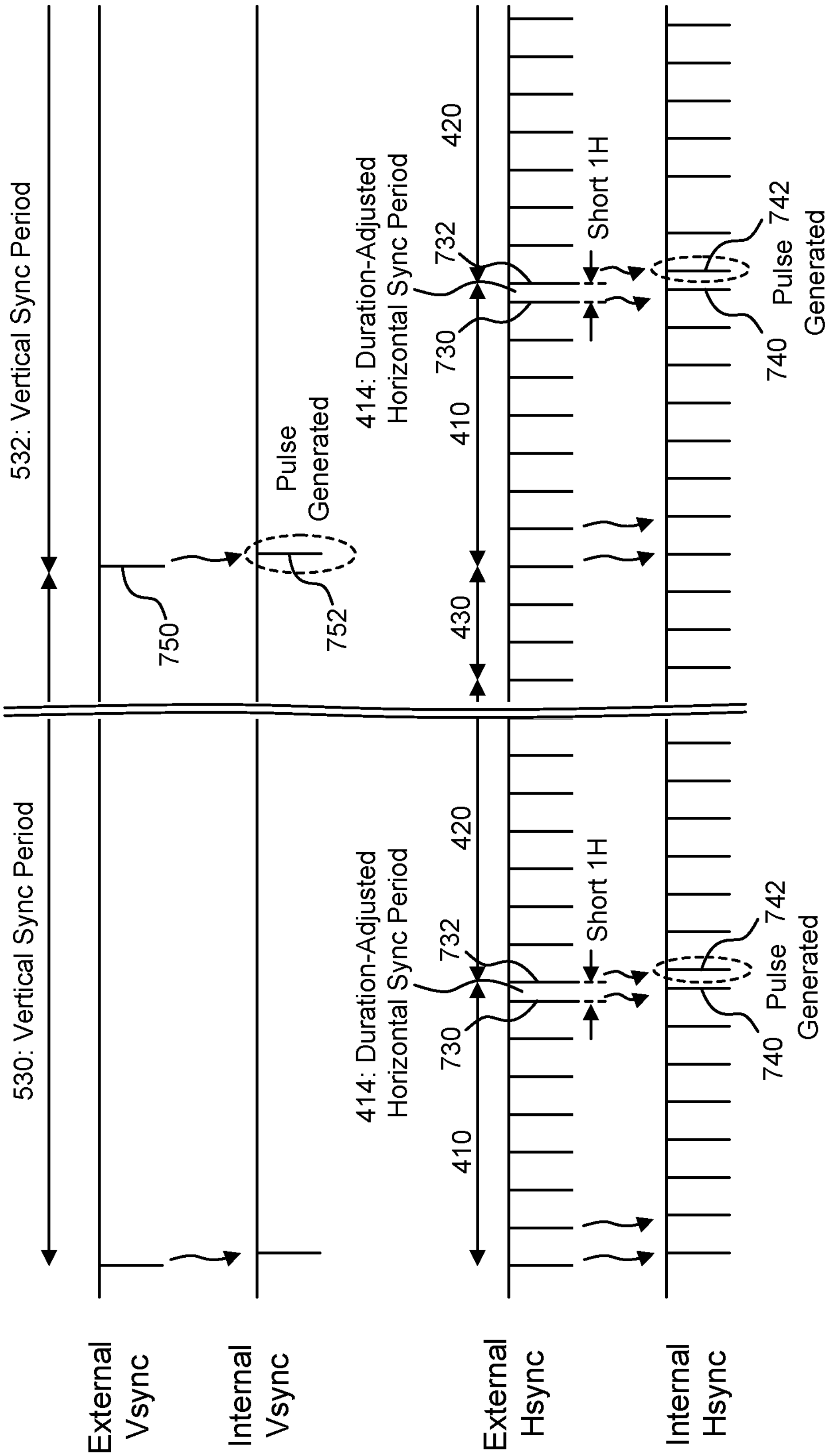
FIG. 7A shows an exemplary operation of a timing controller during vertical sync periods each including a duration-adjusted horizontal sync period, according to one or more examples of the present disclosure.

FIG. 7A shows an exemplary operation of the timing controller 160 during vertical sync periods 530 and 532 each including a duration-adjusted horizontal sync period 414, according to one or more examples of the present disclosure. In one embodiment, the duration-adjusted horizontal sync period 414 is provided at the end of the blanking period 410 of each vertical sync period. The duration-adjusted horizontal sync period 414 may be provided at any temporal position in the blanking period 410 or 430 other than at the end of the blanking period 410.

In the shown embodiment, the timing controller 160 detects a pulse 730 in the external Hsync signal during the vertical sync period 530 and generates a pulse 740 of the internal Hsync signal in response to the detection of the pulse 730 in the external Hsync signal. The timing controller 160 further identifies the pulse 730 as the pulse that defines the start of the duration-adjusted horizontal sync period 414 based on the count of the pulses in the external Hsync signal during the vertical sync period 530. Since the duration-adjusted horizontal sync period 414 is defined as a non-masking period, the timing controller 160 is still allowed to detect a pulse of the external Hsync signal during the duration-adjusted horizontal sync period 414. The timing controller 160 successfully detects a pulse 732 in the external Hsync signal that defines the end of the duration-adjusted horizontal sync period 414 and generates a corresponding pulse 742 of the internal Hsync signal in response to the detection of the pulse 732 in the external Hsync signal. Further, since the timing controller 160 correctly counts the pulses of the external Hsync signal, the timing controller 160 successfully detects a pulse 750 in the external Vsync signal after the masking period for the external Vsync signal has expired based on the count of pulses of the external Hsync signal during the vertical sync period 530. The timing controller 160 generates a pulse of the internal Vsync signal in response to the detection of the pulse 750 in the external Vsync signal. A similar operation is performed during the vertical sync period 532. The operation of the timing controller 160 shown in FIG. 7A effectively avoids the occurrence of image artifacts potentially caused by the failure to detect the pulses that define the ends of the duration-adjusted horizontal sync periods.

Figure 7B:
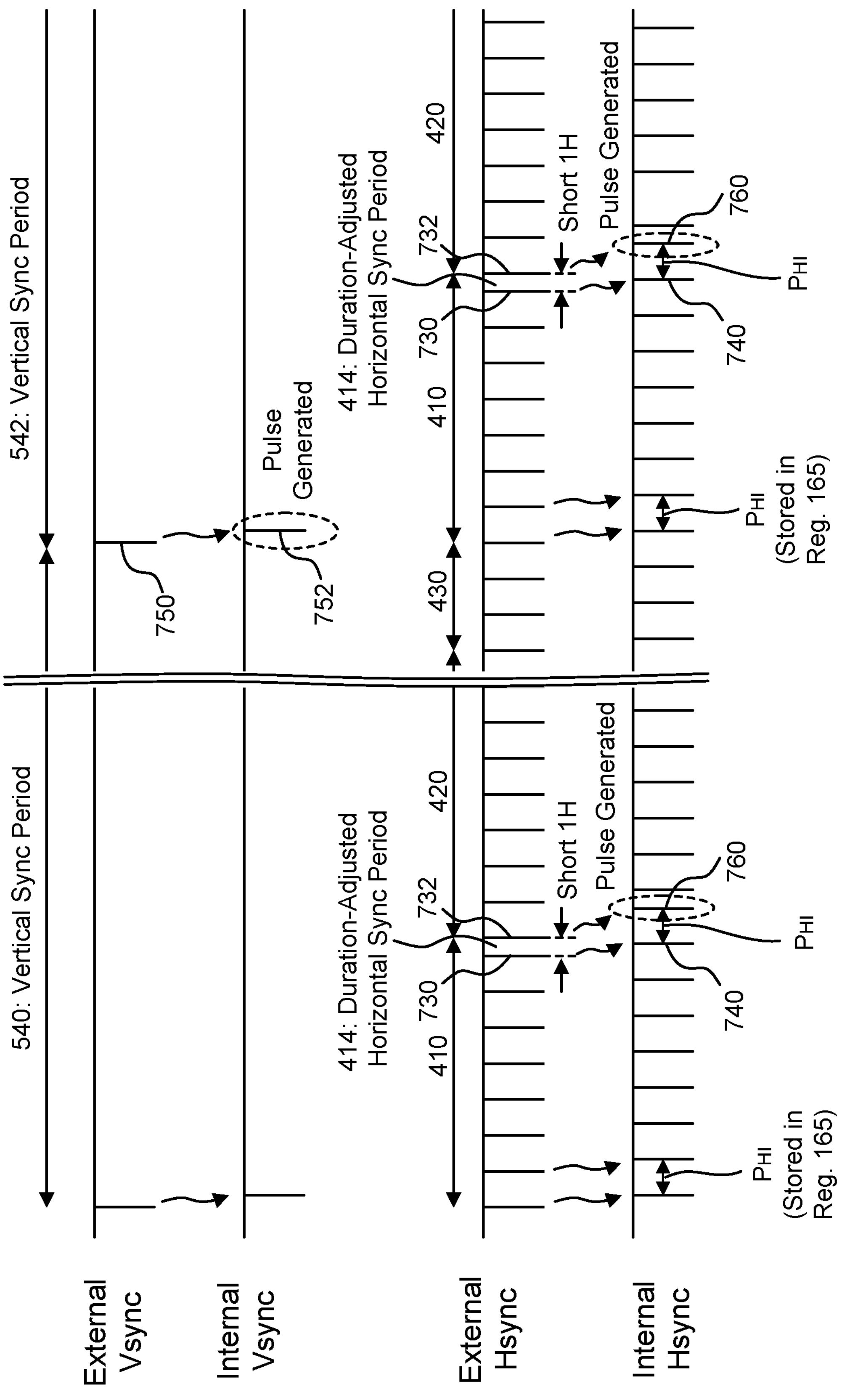
FIG. 7B shows another exemplary operation of a timing controller during vertical sync periods each including a duration-adjusted horizontal sync period, according to one or more examples of the present disclosure.

FIG. 7B shows another exemplary operation of the timing controller 160 during vertical sync periods 540 and 542 each including a duration-adjusted horizontal sync period 414, according to one or more examples of the present disclosure. The operation shown in FIG. 7B is similar to the operation shown in FIG. 7A except for the timing of the generation of a pulse 760 of the internal Hsync signal in response to the detection of the pulse 732 in the external Hsync signal which defines the end of the duration-adjusted horizontal sync period 414. In the embodiment shown in FIG. 7B, the timing controller 160 is configured to measure the time interval between adjacent two pulses of the external Hsync signal other than the pulses that define the starts and ends of the duration-adjusted horizontal sync periods 414. The timing controller 160 is further configured to determine a specified time interval PHI between adjacent two pulses of the internal Hsync signal based on the measured time intervals between adjacent two pulses of the external Hsync signal and store the specified time interval PHI in the register 165 (shown in FIG. 1). In some implementations, the specified time interval PHI may be equal to the measured time interval between the adjacent two pulses of the external Hsync signal. In embodiments where the number of the pulses of the internal Hsync signal is different from the number of pulses of the external Hsync signal, the specified time interval PHI may be different from the measured time interval between the adjacent two pulses of the external Hsync signal. The timing controller 160 is further configured to generate the pulse 760 of the internal Hsync signal after a time period with a duration equal to the specified time interval PHI has elapsed after the timing controller 160 detects the pulse 730 in the external Hsync signal. It is noted that the pulse 730 of the external Hsync signal defines the start of the duration-adjusted horizontal sync period 414. The generation timing of the pulse 760 based on the specified time interval PHI may be preferably used in embodiments where the number of the pulses of the external Hsync signal is different from the number of the pulses of the internal Hsync signal.

Figure 8:
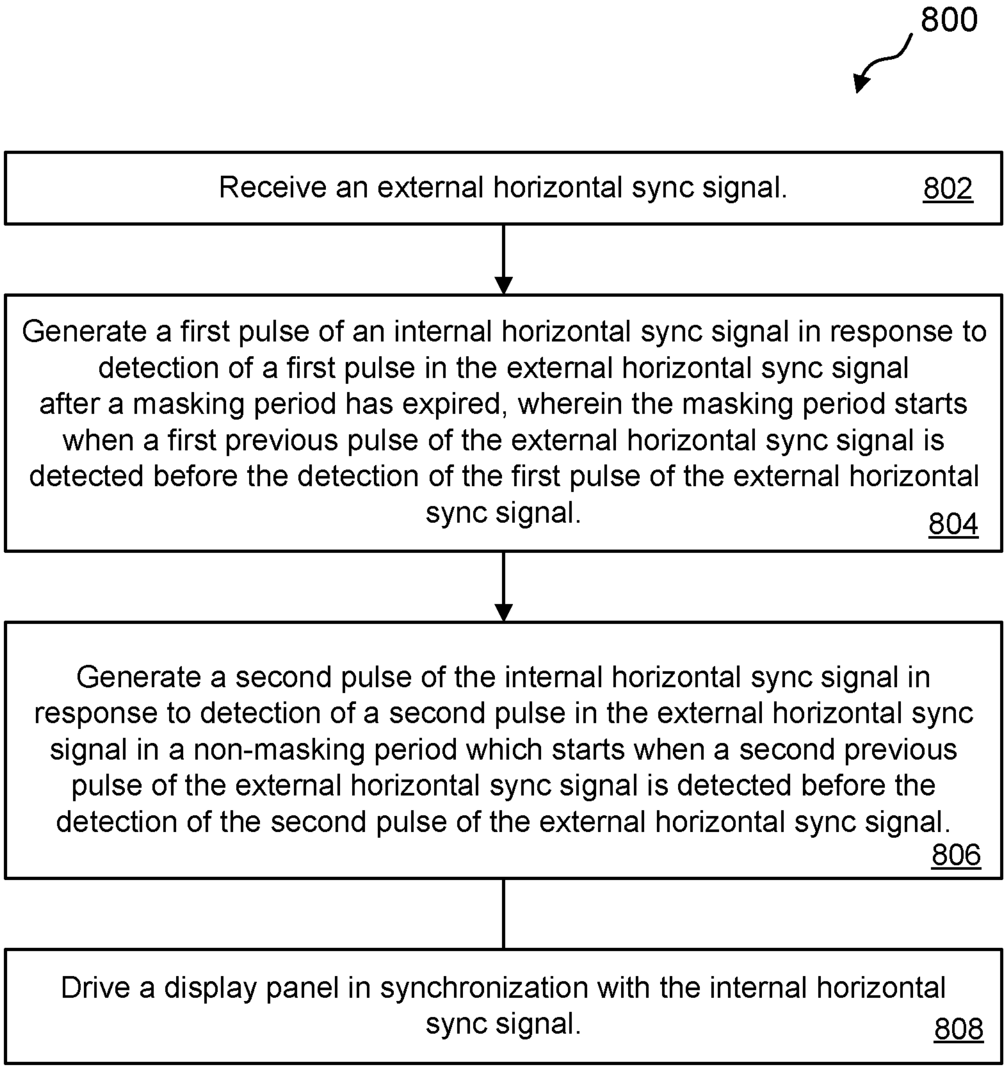
FIG. 8 is a flowchart of an exemplary process for driving a display panel, according to one or more examples of the present disclosure.

FIG. 8 is a flowchart of an exemplary process for driving a display panel, according to one or more examples of the present disclosure. The process 800 may be performed by the display device 1000 shown in FIG. 1. However, it will be recognized that a display device that includes additional and/or fewer components as shown in FIG. 1 may be used to perform the process 800, that any of the following steps may be performed in any suitable order, and that the process 800 may be performed in any suitable environment.

The process 800 includes receiving an external horizontal sync signal at step 802.

The process 800 further includes generating, at step 804, a first pulse of an internal horizontal sync signal (e.g., the pulses 740 shown in FIGS. 7A and 7B) in response to detection of a first pulse of the external horizontal sync signal (e.g., the pulses 712 and 716 shown in FIG. 6 and the pulses 730 shown in FIG. 7A) after a masking period (e.g., the masking periods 720 and 724 shown in FIG. 6) has expired. The masking period starts when a first previous pulse (e.g., the pulses 710 and 714 shown in FIG. 6) of the external horizontal sync signal is detected before the detection of the first pulse of the external horizontal sync signal.

The process 800 further includes generating, at step 806, a second pulse (e.g., the pulses 742 shown in FIG. 7A and the pulses 760 shown in FIG. 7B) of the internal horizontal sync signal in response to detection of a second pulse of the external horizontal sync signal (e.g., the pulse 714 shown in FIG. 6 and the pulses 732 shown in FIGS. 7A and 7B) in a non-masking period (e.g., the duration-adjusted horizontal sync period 722 shown in FIG. 6). The non-masking period starts when a second previous pulse of the external horizontal sync signal (e.g., the pulse 712 shown in FIG. 6 and the pulses 730 shown in FIGS. 7A and 7B) is detected before the detection of the second pulse of the external horizontal sync signal.

The process 800 further includes driving a display panel (e.g., the display panel 200 shown in FIG. 1) in synchronization with the internal horizontal sync signal at step 808.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A display driver, comprising:

a timing controller configured to:
- receive an external horizontal sync signal; and
- generate an internal horizontal sync signal based on the external horizontal sync signal; and a driver circuit configured to drive a display panel in synchronization with the internal horizontal sync signal, wherein generating the internal horizontal sync signal comprises:

generating a first pulse of the internal horizontal sync signal in response to detection of a first pulse of the external horizontal sync signal after a masking period has expired, wherein the masking period starts when the timing controller detects a first previous pulse of the external horizontal sync signal before the detection of the first pulse of the external horizontal sync signal; and generating a second pulse of the internal horizontal sync signal in response to detection of a second pulse of the external horizontal sync signal in a non-masking period which starts when the timing controller detects a second previous pulse of the external horizontal sync signal before the detection of the second pulse of the external horizontal sync signal, wherein the non-masking period starts in response to a count of pulses of the external horizontal sync signal reaching a predetermined number.

2. The display driver of claim 1, wherein the timing controller is further configured to discard one or more pulses that appear in the external horizontal sync signal during the masking period.

3. The display driver of claim 1, wherein the timing controller is further configured to discard no pulse that appears in the external horizontal sync signal during the non-masking period.

4. The display driver of claim 1, wherein the non-masking period corresponds to a duration-adjusted horizontal sync period having a duration adjusted such that an end of a last horizontal sync period of a first vertical sync period that comprises the duration-adjusted horizontal sync period is coincident with a start of a second vertical sync period that follows the first vertical sync period.

5. The display driver of claim 4, wherein the duration of the duration-adjusted horizontal sync period is different from a duration of a different horizontal sync period of the first vertical sync period.

6. The display driver of claim 4, wherein the duration-adjusted horizontal sync period is disposed in a blanking period of the first vertical sync period.

7. The display driver of claim 4, wherein the timing controller is further configured to determine, based on the external horizontal sync signal, a time interval between adjacent pulses of the internal horizontal sync signal, and wherein generating the second pulse of the internal horizontal sync signal comprises generating the second pulse after a time period has elapsed after the timing controller detects the second previous pulse, and the time period has a duration equal to the determined time interval.

8. A system comprising:

an external source configured to provide an external horizontal sync signal;

a display driver configured to:

generate an internal horizontal sync signal based on the external horizontal sync signal; and drive a display panel in synchronization with the internal horizontal sync signal, wherein generating the internal horizontal sync signal comprises:

generating a first pulse of the internal horizontal sync signal in response to detection of a first pulse of the external horizontal sync signal after a masking period has expired, wherein the masking period starts when the display driver detects a first previous pulse of the external horizontal sync signal before the detection of the first pulse of the external horizontal sync signal; and generating a second pulse of the internal horizontal sync signal in response to detection of a second pulse of the external horizontal sync signal in a non-masking period which starts when the display driver detects a second previous pulse of the external horizontal sync signal before the detection of the second pulse of the external horizontal sync signal, wherein the non-masking period starts in response to a count of pulses of the external horizontal sync signal reaching a predetermined number.

9. The system of claim 8, wherein the display driver is further configured to discard one or more pulses that appear in the external horizontal sync signal during the masking period.

10. The system of claim 8, wherein the display driver is further configured to discard no pulse that appears in the external horizontal sync signal during the non-masking period.

11. The system of claim 8, wherein the non-masking period corresponds to a duration-adjusted horizontal sync period, and wherein the duration-adjusted horizontal sync period is adjusted such that an end of a last horizontal sync period of a first vertical sync period that comprises the duration-adjusted horizontal sync period is coincident with a start of a second vertical sync period that follows the first vertical sync period.

12. The system of claim 11, wherein the duration of the duration-adjusted horizontal sync period is different from a duration of a different horizontal sync period of the first vertical sync period.

13. The system of claim 11, wherein the duration-adjusted horizontal sync period is disposed in a blanking period of the first vertical sync period.

14. The system of claim 11, wherein the display driver is further configured to determine, based on the external horizontal sync signal, a time interval between adjacent pulses of the internal horizontal sync signal, and wherein generating the second pulse of the internal horizontal sync signal comprises generating the second pulse after a time period has elapsed after the display driver detects the second previous pulse, the time period having a duration equal to the determined time interval.

15. A method, comprising:

receiving an external horizontal sync signal; and generating a first pulse of an internal horizontal sync signal in response to detection of a first pulse of the external horizontal sync signal after a masking period has expired, wherein the masking period starts when a first previous pulse of the external horizontal sync signal is detected before the detection of the first pulse of the external horizontal sync signal;

generating a second pulse of the internal horizontal sync signal in response to detection of a second pulse of the external horizontal sync signal in a non-masking period which starts when a second previous pulse of the external horizontal sync signal is detected before the detection of the second pulse of the external horizontal sync signal, wherein the non-masking period starts in response to a count of pulses of the external horizontal sync signal reaching a predetermined number; and driving a display panel in synchronization with the internal horizontal sync signal.

16. The method of claim 15, further comprising discarding one or more pulses that appear in the external horizontal sync signal during the masking period.

17. The method of claim 15, wherein the non-masking period is a duration-adjusted horizontal sync period, and wherein the method further comprises adjusting a duration of the duration-adjusted horizontal sync period such that an end of a last horizontal sync period of a first vertical sync period that comprises the duration-adjusted horizontal sync period is coincident with a start of a second vertical sync period that follows the first vertical sync period.

18. The method of claim 17, wherein the duration-adjusted horizontal sync period is disposed in a blanking period of the first vertical sync period.

* * * * *